Nov. 23, 1965  P. RUDNICK  3,218,655
VERTICALLY COMPENSATED SPAR BUOY
Filed July 11, 1963
FIG 2
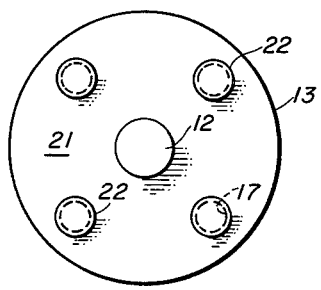
FIG. 4
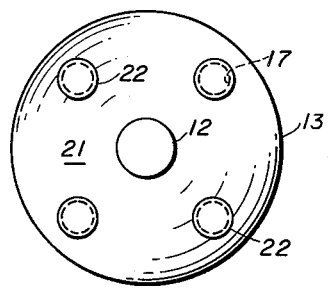
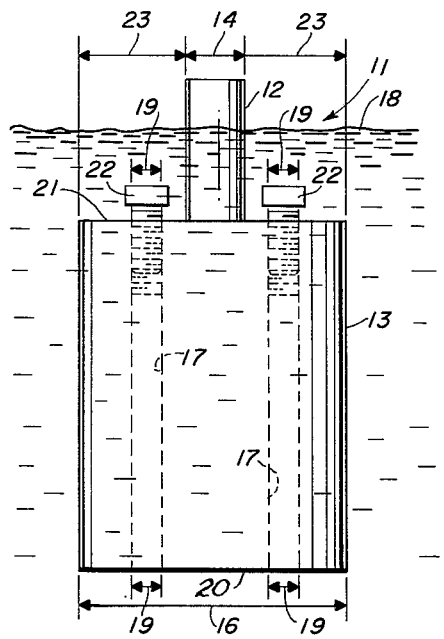
FIG. 1
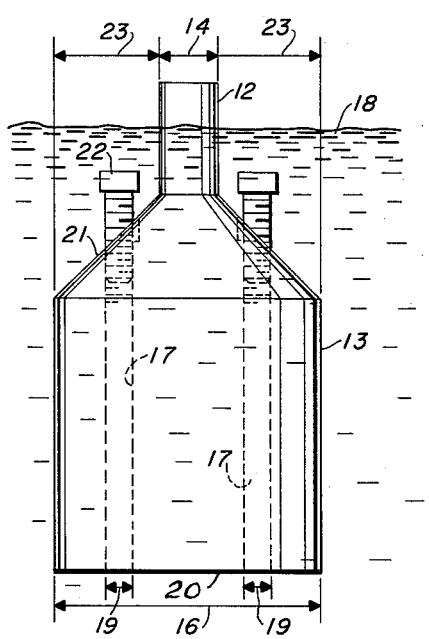
FIG. 3
INVENTOR.
PHILIP (NMI) RUDNICK

United States Patent Office 3,218,655
Patented Nov. 23, 1965

3,218,655
VERTICALLY COMPENSATED SPAR BUOY
Philip Rudnick, La Jolla, Calif., assignor to The Regents of the University of California
Filed July 11, 1963, Ser. No. 294,375
2 Claims. (Cl. 9—8)

The present invention relates to a vertically compensated spar buoy and more particularly to a vertically compensated spar buoy in which upward and downward forces on the buoy due to wave pressure cancel.

When a body of water, such as a portion of the ocean, is at rest in equilibrium, its surface lies in a horizontal plane. The pressure at any point in the water is then called the equilibrium pressure; it is very closely a linear function of the depth. When the surface of the water is disturbed by a wave motion, the pressure at a point below and close to the surface becomes variable, fluctuating above and below the equilibrium pressure. The departure of the actual pressure from the equilibrium pressure at the same point is called the wave pressure. It is time-dependent, assuming both positive and negative values.

Wave pressure decreases in amount with increasing depth, becoming imperceptible at great depth. This decrease has its simplest form when the wave at the surface is sinusoidal in shape. In this case the wave pressure decreases exponentially with increasing depth at a rate fixed by the wavelength of the waves. In symbols, $$p = p_0 \exp(-2\pi d/\lambda) \qquad (1)$$

when $p$ is the wave pressure at depth $d$ associated with waves of wavelength $\lambda$, and $p_0$ is the wave pressure at or just below the surface.

Any wave motion, however complex or irregular, can be analyzed into sinusoidal components, each with its own wavelength. The wave pressure associated with each component will obey Equation 1, the pressure being an exponential function of the reciprocal of the wavelength. See "Hydrodynamics," H. Lamb, 6th edition, Dover Publications, New York, 1945, Art. 227, 228, 229, in particular Equations 12 of Art. 228 and 3 of Art. 227.

For simplicity in the following discussion, only forces arising from pressure will be considered and no mention will be made of frictional or drag forces which must certainly also be present. It will also be considered that actually occurring waves can be adequately represented by a single wavelength.

The vertical forces resulting from surface waves which cause vertical movement of a spar buoy are the vector sums of the products of projected or resultant horizontal areas and the wave pressures acting thereon. Hence, the sum of the projected or resultant upper surfaces multiplied by wave pressures will give the total downward forces acting on a buoy from surface waves. Similarly, the horizontal projections of downward surfaces multiplied by the wave pressures will result in the upward forces against a spar buoy from surface waves.

In the prior art two design criteria have been used to obtain reduction of vertical motion of a spar buoy due to surface wave forces: the horizontal cross-sectional area at the water line is made as small as possible and the submerged volume made as large as possible, resulting in a maximum natural period of vertical oscillation; and horizontal projections or components of submerged surfaces are made as small as possible and located as deep as possible in an effort to reduce the amount of vertical forces arising from pressure perturbations due to waves. According to these principles the best configuration for a spar buoy has been considered to be a uniform horizontal cross-section together with greatest feasible draft.

However, there is a substantial practical conflict between the requirement of a natural period which is sufficiently long, that is to say beyond the periods of natural waves, and reasonable limitations on the total length, or draft, of the buoy. As a numerical example, natural waves of substantial height occur with periods as great as 20 seconds. In order to give a buoy a natural period of vertical oscillation of 25 seconds its total length must be slightly over 500 feet if its cross section is uniform at and everywhere below the water line. The total length can be reduced to 125 feet while retaining the 25 second natural period, by increasing the cross section of the buoy below the water line relative to that at the water line by a factor somewhat greater than four, depending on the depth at which the change in cross section is located.

Any such change of configuration causes the bottom of the buoy to experience upward forces arising from greater wave pressure because of its shallower depth, and also createst submerged upper surfaces which experience downward forces. If the upward forces and downward forces can be made substantially equal for a given surface wave condition, the two forces will approximately cancel resulting in minimum vertical motion imparted to the buoy from surface waves. According to the invention, this is accomplished by designing the upward and downward horizontal surface areas, and their respective depths, to effect a force cancellation from a predetermined surface wave condition as will be more fully explained below. If, further, the upward and downward forces are both directly proportional to the first power of the wave amplitude, then a buoy configuration which produces a cancellation of forces for waves of one wavelength, will also, without change of configuration, produce cancellation for all waves of that same wavelength, regardless of amplitude. According to the invention, this result is brought about by providing a uniform cross section at the water line. This also is more fully explained below.

It is thus an object of the present invention to provide a spar buoy of a configuration for cancellation of vertical wave forces.

Another object is to provide a spar buoy having optimum horizontal projected areas.

Still another object is to provide a spar buoy in which the horizontal projected areas can be adjusted for optimum cancellation of vertical forces.

A still further object of the invention is the provision of an improved spar buoy which is simple to construct with optimum configuration for cancellation of vertical surface wave forces.

Yet another object is to provide a spar buoy of a configuration for cancellation of forces arising from waves of predetermined wavelength but arbitrary amplitude.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a side elevation view of one embodiment of the present invention;

FIG. 2 is a top view of the embodiment of FIG. 1;

FIG. 3 is a side elevation view of another embodiment of the present invention; and FIG. 4 is a top view of FIG. 3.

Referring to FIGS. 1 and 2, a spar buoy embodying the present invention is shown generally at 11 having top portion 12 and bottom portion 13. Top portion 12 has a diameter shown at 14 and bottom portion 13 has a diameter shown at 16. Vertical channels 17 have diameters shown at 19. Threaded plugs 22 are threadedly engaged with channels 17.

Referring to FIGS. 3 and 4, the only difference is that top surface 21 of bottom portion 13 of FIG. 4 is not horizontal. Other than this variance the two embodiments are identical. The horizontal component or projection of surface 21 of FIG. 3 is shown at 23 and is identical to the horizontal dimension shown at 23 of FIG. 1. Hence, a pressure of the same average amplitude applied externally against surface 21 of either FIG. 1 or 3 will result in the same downward force. It can be seen that since pressure from a surface wave decreases exponentially with depth, that the general configuration of the embodiment of FIG. 3 can be designed for an identical total force against surface 21 as that of the embodiment of FIG. 1. The two configurations have been shown because it is easier to illustrate the principle of the instant invention with reference to FIGS. 1 and 2 as opposed to the embodiment illustrated in FIGS. 3 and 4, although the sloping surface 21 of FIG. 3 will lend greater overall structural strength to the buoy and for this reason is preferred to the configuration of FIG. 1.

The ratio of wave pressures, $P_{21}$ and $P_{20}$ at the respective depth $d_1$ of surface 21, and $d_2$ of surface 20 in FIG. 1 will, according to Equation 1, depend on the difference in depths $(d_2-d_1)$, which is equal to the length L which is the vertical distance between the surfaces 21 and 20.

$$P_{21}/P_{20} = P_0 \exp(2\pi L/\lambda) \qquad (2)$$

With plugs 22 in place as shown the horizontal area receptive to a downward vertical pressure will be the surface area of top surface 21 of bottom portion 13. This area designated $A_{21}$ will then be the product of $\pi$ and the square of one-half of dimension 16 minus the area of top portion 14, which will be the product of $\pi$ and the square of one-half the dimension 14. This can be expressed mathematically as follows:

$$A_{21} = \pi\left[\frac{(\text{dimension } 16)}{2}\right]^2 - \pi\left[\frac{(\text{dimension } 14)}{2}\right]^2 \qquad (3)$$

The downward force $F_{21}$ against buoy 11 will be this area $A_{21}$ times the wave pressure $P_{21}$ at that depth. This can be expressed mathematically as follows:

$$F_{21} = A_{21}P_{21} \qquad (4)$$

The upward force $F_{20}$ against buoy 11 will then be the area of bottom surface 20 of bottom portion 13 times the wave pressure $P_{20}$ at that depth. This can be expressed mathematically as follows:

$$F_{20} = A_{20}P_{20} \qquad (5)$$

Hence, when the two forces are equal or the ratio of the areas is equal to the inverse ratio of the pressures, the two forces will cancel, resulting in minimum vertical motion imparted to buoy 11 from a given surface wave. From Equation 2, if the wavelength of surface wave changes, the ratio of pressures $P_{21}$ and $P_{20}$ will likewise change, resulting in an imbalance between the upward and downward vertical forces. Removal of plugs 22 will cause a greater relative decrease in the area of top surface 21 of bottom portion 13, than in the area of bottom surface 20 of bottom portion 13. Hence, resultant ratio of the two areas can be adjusted by removal and replacing of plugs 22.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

I claim:
1. A spar buoy comprising:
   a cylindrical top section above and below the water line;
   a bottom section below said cylindrical top section;
   said bottom section having a larger cross-sectional area than said cylindrical top section;
   said bottom section having upward and downward surfaces at predetermined depths each with horizontal components;
   said upward and downward surfaces being dimensioned for an equality between the product of any upward horizontal component areas and predetermined wave pressure thereon, and the product of any downward horizontal component areas and a predetermined wave pressure thereon.
2. The spar buoy of claim 1 wherein said areas are adjustable.

References Cited by the Examiner
UNITED STATES PATENTS

| | | | |
|---|---|---|---|
| 388,971 | 9/1888 | Hichborn | 9—8 |
| 3,080,583 | 3/1963 | Fuller | 9—8 |

FOREIGN PATENTS

| | | |
|---|---|---|
| 518,633 | 3/1940 | Great Britain. |

FERGUS S. MIDDLETON, *Primary Examiner.*